United States Patent
Hasegawa et al.

(10) Patent No.: US 8,671,877 B2
(45) Date of Patent: Mar. 18, 2014

(54) COATING APPARATUS

(75) Inventors: Koji Hasegawa, Itami (JP); Takuya Nagato, Itami (JP); Koh Matsui, Itami (JP)

(73) Assignee: Kabushiki Kaisha Powrex, Hyogo (JP)

( * ) Notice: Subject to any disclaimer, the term of this patent is extended or adjusted under 35 U.S.C. 154(b) by 0 days.

(21) Appl. No.: 13/512,947

(22) PCT Filed: Dec. 2, 2010

(86) PCT No.: PCT/JP2010/071561
§ 371 (c)(1),
(2), (4) Date: May 31, 2012

(87) PCT Pub. No.: WO2011/068153
PCT Pub. Date: Jun. 9, 2011

(65) Prior Publication Data
US 2012/0234239 A1    Sep. 20, 2012

(30) Foreign Application Priority Data
Dec. 3, 2009  (JP) ................................. 2009-275319

(51) Int. Cl.
*B05C 3/00* (2006.01)
*B05C 11/00* (2006.01)
*C23C 16/52* (2006.01)

(52) U.S. Cl.
USPC ................................ 118/418; 118/712; 427/8

(58) Field of Classification Search
None
See application file for complete search history.

(56) References Cited

U.S. PATENT DOCUMENTS

| 4,230,615 A | 10/1980 | Crocker et al. |
| 5,038,709 A | 8/1991 | Yamada et al. |

(Continued)

FOREIGN PATENT DOCUMENTS

| DE | 44 41 350 | 6/1996 |
| JP | 61-138528 | 6/1986 |

(Continued)

OTHER PUBLICATIONS

Perez-Ramos et al, Quantitative Analysis of Film Coating in a Pan Coater Based on In-Line Sensor Measurements, PharmSciTech 6(1), 2005, pp. E127-E136.*

(Continued)

*Primary Examiner* — Dah-Wei Yuan
*Assistant Examiner* — Charles Capozzi
(74) *Attorney, Agent, or Firm* — Wenderoth, Lind & Ponack, L.L.P.

(57) ABSTRACT

A measuring unit 13 is provided inside a rotary drum 11. The measuring unit 13 is provided with a light transmitting member 13a and an optical sensor 13b that are provided at the central region on the inner wall of the other end portion 11b. When particles are subjected to a coating treatment, information as to the properties (such as the coating thickness, the moisture, the coating performance, and the impurity) of the particles of a particle layer A being brought into contact with the surface of the light transmitting member 13a is measured on a real-time basis by the NIR sensor 13b via the light transmitting member 13a. The data is processed by the processing unit of the NRI spectroscopic analyzer to thereby perform monitoring. By appropriately adjusting the coating operation conditions (such as the supplied air volume, the supplied air temperature, the spraying condition, and the rotation speed of the rotary drum 1) by feedback control or a manual operation according to the result, it becomes possible to perform the coating treatment of high quality.

3 Claims, 2 Drawing Sheets

(56) References Cited

U.S. PATENT DOCUMENTS

| | | |
|---|---|---|
| 5,278,412 A | 1/1994 | DeThomas et al. |
| 5,351,322 A | 9/1994 | VonBargen |
| 2002/0061349 A1 | 5/2002 | Banko et al. |
| 2004/0109936 A1 | 6/2004 | Banko et al. |
| 2006/0096527 A1 | 5/2006 | Hasegawa et al. |
| 2008/0107570 A1 | 5/2008 | Hansen et al. |
| 2011/0088620 A1 | 4/2011 | Maurer |

FOREIGN PATENT DOCUMENTS

| | | |
|---|---|---|
| JP | 2-56233 | 2/1990 |
| JP | 7-794 | 1/1995 |
| JP | 7-5102 | 1/1995 |
| JP | 7-107925 | 4/1995 |
| JP | 2001-58125 | 3/2001 |
| JP | 2004-148292 | 5/2004 |
| WO | 01/70195 | 9/2001 |
| WO | 2006/067546 | 6/2006 |
| WO | 2009/150166 | 12/2009 |

OTHER PUBLICATIONS

Ugwoke et al. "Application of process analytical technology in tablet process development using NIR spectroscopy: Blend uniformity, content uniformity and coating thickness measurements," International Journal of Pharmaceutics, 357, pp. 108-118 (2008).*

International Preliminary Report on Patentability and Written Opinion of the International Searching Authority issued Jul. 19, 2012 in International (PCT) Application No. PCT/JP2010/071561.

International Search Report issued Mar. 8, 2011 in International (PCT) Application No. PCT/JP2010/071561.

Supplementary European Search Report issued Dec. 12, 2013 in corresponding European Application No. 10834603.2.

* cited by examiner

ABS

COATING APPARATUS

TECHNICAL FIELD

The present invention relates to a coating apparatus that performs coating, mixing, drying and the like of particles such as pharmaceutical drugs, food, and agricultural chemicals. More particularly, the present invention relates to a coating apparatus that includes a rotary drum being driven to rotate about an axis.

BACKGROUND ART

A coating apparatus that includes a rotary drum is used for providing a film coating, a sugar coating or the like to each of tablets, soft capsules, pellets, granules and other similar materials (hereinafter, collectively referred to the particles) of pharmaceutical drugs, food, agricultural chemicals and the like.

The coating apparatus of this type is disclosed in, e.g., Patent Documents 1 and 2.

Patent Document 1 discloses a coating apparatus that includes a ventilatory rotary drum being driven to rotate about a horizontal axis. The rotary drum is structured with a polygonal sleeve-like circumferential wall portion, a polygonal pyramid-shaped one end portion that extends from one end of the circumferential wall portion toward one side in the axial direction, and a polygonal pyramid-shaped other end portion that extends from other end of the circumferential wall portion toward the other side in the axial direction. To each face of the circumferential wall portion, a porous plate is attached. The porous portion of each porous plate provides ventilation to the circumferential wall portion. Then, a jacket is attached on the outer circumferential side of each porous plate, whereby a ventilation channel is formed between the jacket and each porous plate.

Further, on the other end side of the rotary drum, that is, on the side where a rotary drive mechanism including a motor or the like is installed, a ventilation mechanism that controls ventilation of treatment gas such as dry air to the rotary drum is installed. This ventilation mechanism has a function of establishing communication between ventilation channels that arrive at prescribed positions in accordance with the rotation of the rotary drum and an air supply duct and an air discharge duct, respectively.

For example, when a certain ventilation channel arrives at the top portion of the rotary drum in accordance with the rotation of the rotary drum, that ventilation channel communicates with the air supply duct; and when a certain ventilation channel arrives at the bottom portion of the rotary drum, that ventilation channel communicates with the air discharge duct. Accordingly, the treatment gas introduced from the air supply duct to the ventilation channel at the top portion of the rotary drum flows into the rotary drum via the porous plate at the top portion of the circumferential wall portion. After passing through the inside of a particle layer (tumbling bed), the treatment gas flows out to the ventilation channel via the porous plate at the bottom portion of the circumferential wall portion, and further passes through the ventilation channel to be discharged to the air discharge duct.

Patent Document 2 discloses a structure which is a coating apparatus including a ventilatory rotary drum that accommodates therein particles to be processed and that is driven to rotate about its axis. The rotary drum has, along its axial direction, a one end portion, an other end portion, and a circumferential wall portion that allows the one end portion and the other end portion to be continuous. The other end portion is positioned on the side of a rotary drive mechanism that drives the rotary drum to rotate. A ventilation port is provided to each of the one end portion and the other end portion. The ventilation port provided to one of the one end portion and the other end portion serves as an air supply port for supplying the treatment gas from the outside to the inside of the rotary drum. The ventilation port provided to the other one of the one end portion and the other end portion serves as an air discharge port for discharging the treatment gas from the inside of the rotary drum to the outside. The treatment gas supplied into the rotary drum via the air supply port passes through the inside of a particle layer in the rotary drum, and is discharged from the air discharge port.

Though the rotary drum is of ventilatory, the ventilation port is provided to each of the one end portion and the other end portion, and the circumferential wall portion is not provided with any ventilation portions (porous portions) for supplying or discharging air. Accordingly, it is not necessary to provide a complicated ventilation structure in which the ventilation portions (porous portions) of the circumferential wall portion are covered with jackets from the outer circumferential side to form ventilation channels as seen in the conventional ventilatory rotary drum. That is, while the coating apparatus of this invention includes a ventilatory rotary drum, the circumferential wall portion of the rotary drum has no ventilation portions (porous portions) for supplying or discharging air. In other words, the circumferential wall portion of the rotary drum has an air-tight structure. Further, there are no ventilation channels covered by jackets on the outer circumferential side of the circumferential wall portion of the rotary drum. Accordingly, as compared to the conventional apparatus, the cleaning work and the validation work after cleaning can easily and surely be performed.

The ventilation port of one of the one end portion and the other end portion is dedicated to supplying air, and the other ventilation port is dedicated to discharging air. The treatment gas (hot air, cold air or the like) supplied into the rotary drum via the air supply port of the one end portion or that of the other end portion passes through the particle layer in the rotary drum and is discharged from the air discharge port of the other end portion or that of the one end portion. Thus, ventilation is carried out throughout the inside of the particle layer, and treatment such as drying of the particle layer can evenly and fully be performed.

The rotary, drum is installed in a state in which its axis forms a prescribed angle $\theta$ that falls within a range of $0° \le \theta \le 90°$ relative to the horizontal line. That is, the rotary drum is installed and operated in one of the states in which: its axis is in parallel with the horizontal line ($\theta=0°$); its axis is in parallel with the vertical line ($\theta=90°$); and its axis is tilted relative to the horizontal line ($0°<\theta<90°$). Preferably, the rotary drum is installed in a state in which its axis is tilted by a prescribed angle $\theta$ relative to the horizontal line. In this case, the tilt angle $\theta$ of the axis is set to $20° \le \theta \le 70°$, more preferably $30° \le \theta \le 45°$, and particularly $\theta=30°$ or $\theta=45°$.

Since the axis of the rotary drum is tilted by the prescribed angle $\theta$ relative to the horizontal line, the bulk volume of the particles that can be treated in the rotary drum increases. Therefore, the throughput per treatment increases, whereby the production efficiency improves. Further, as the rotary drum rotates about the tilted axis, the particles accommodated in the rotary drum flow in accordance with the rotation of the rotary drum in a state associated with the movement in the rotary direction and the movement in the axial direction. Therefore, the effect of agitating and mixing the particle layer is great. For example, even in a case where a so-called baffle (agitator blade) is not arranged inside the rotary drum, sufficient agitating and mixing effect can be obtained. It goes without saying that, when the baffle is used in combination, a greater agitating and mixing effect can be obtained. When the axis of the rotary drum is tilted, normally, the rear end portion of the rotary drum is positioned on the tilted downward side.

PRIOR ART DOCUMENTS

Patent Documents

Patent Document 1: Japanese Unexamined Patent Application Publication No. 2001-58125
Patent Document 2: Japanese Unexamined Patent Application Publication No. 2004-148292

SUMMARY OF THE INVENTION

Problems to be Solved by the Invention

The coating quality is determined by mixability, drying efficiency, spraying performance in terms of the apparatus, and hence rigorous parameter setting is required. In many cases, such parameter setting requires skilled manufacturers.

The moisture value of the input tablets often varies from day to day. However, the tablet preheating before the coating operation is generally controlled by time or the temperature of the discharged air (temperature of the product), and the step does not proceed by the moisture value that affects the quality.

The post drying is performed after the spraying. This step is also generally controlled by time or the temperature of the discharged air (temperature of the product), and is not based on monitoring of the moisture value that affects the quality. Therefore, the error is great and precise control cannot be exerted.

The coating performance which is the tablet coating quality is determined by the coating thickness, density and the like. Such measurements are subjected to a post-evaluation after the coating is finished. When the targeted coating performance is not achieved, the coating conditions are reconsidered. Hence, much time and costs are required in order to obtain the desired quality. Generally, this step takes a long time and takes much time and costs for its being in a downstream of the unit operation steps, and no mistake is allowed.

Even when there is an increase or reduction in the tablet moisture value for any reason during the step, there is no way of monitoring the increase and reduction.

In connection with the film coating, in some cases, overdrying is invited depending on the state of the input tablets to make the tablets brittle, which may result in defectives such as chipped edges. In connection with the sugar coating, drying for each cycle is controlled by time. In many cases, this invites an extension of the step time.

According to the conventionally employed tablet moisture control technique, a sensor is arranged in the drum (in the tablet tumbling layer). However, since the surface of the sensor (a thermometer, a variety of sensors such as probes and light sources and the like) is contaminated by spray dust or the like, it is difficult to obtain data of high reproducibility.

When measurement is made from the outside of the drum, since the drum is contaminated by the coating liquid during the coating step, there exist problems of lack of reproducibility of measured values or reliability of measured values.

In recent years, measurement using a near infrared (NIR) sensor is gaining attention. However, it does not solve the problem of contamination of the sensor or the sensor surface, and it is not fully effective.

Solutions to the Problems

In order to solve the problems stated above, the present invention provides a structure of a coating apparatus including a rotary drum that accommodates particles to be treated therein and that is driven to rotate about its axis. A measuring unit is provided in the rotary drum. The measuring unit includes a light transmitting member arranged so as to be brought into contact with a layer of the particles in the rotary drum, and an optical sensor that measures a property of the particles of the particle layer being brought into contact with the light transmitting member via the light transmitting member. The light transmitting member is structured with a transparent glass, for example. With the structure of measuring the property of the particles of the particle layer by the optical sensor via the light transmitting member of the measuring unit, it becomes possible to measure the property of the coating particles on a real-time basis without being affected by the spray dust or contamination of the drum during coating.

In the structure described above, the optical sensor is, e.g., a near infrared sensor of a near infrared (NIR) spectroscopic analyzer. Using the NIR spectroscopic analyzer to measure the tablet quality (moisture or the like) on a real-time basis to thereby perform management, coating products with high reproducibility can be manufactured even when there are variations among the lots.

For example, real-time monitoring and control is exerted as to the coating thickness, the moisture, the coating performance, and the impurities, each of which is the coating quality. With the optical sensor, measurement is performed in a contactless manner via the light transmitting member.

Preferably, one end in the axial direction of the rotary drum is coupled to a hollow drive shaft of a rotary drive mechanism that drives the rotary drum to rotate; the measuring unit is provided at the end of the rotary drum; and the inside of the measuring unit communicates with a hollow portion of the hollow drive shaft. Thus, using the hollow portion of the hollow drive shaft, the optical sensor can be installed inside the measuring unit. Then, the particles (tablets) of the particle layer being brought into contact with the surface of the light transmitting member are measured by the optical sensor. The light transmitting member is preferably arranged such that the light transmitting member is flush with the inner wall surface of the rotary drum so as to avoid abrasion of the tablets. Further, the measuring unit may be provided with air purge for avoiding the particles from attaching to the light transmitting member. The air purge may be warm air for preventing condensation from forming. Further, the air purge may intermittently be input.

EMBODIMENTS OF THE INVENTION

Figure 1:
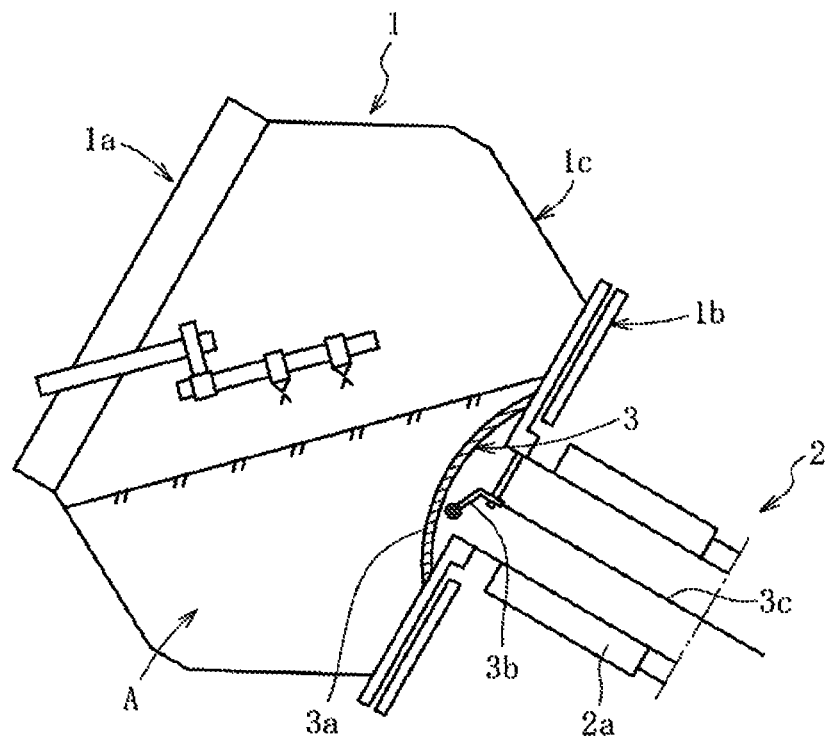
FIG. 1 is a schematic cross sectional view showing an embodiment of the present invention.

FIG. 1 shows a coating apparatus according to a first embodiment of the present invention. The coating apparatus is basically structured similarly to the coating apparatus disclosed in Japanese Unexamined Patent Application Publication No. 2004-148292 (Patent Document 2), and includes a ventilatory rotary drum 1 that is driven to rotate about an axis being tilted relative to the horizontal line.

The rotary drum 1 has, along its axial direction, a one end portion 1a, an other end portion 1b, and a circumferential wall portion 1c that allows the one end portion 1a and the other end portion 1b to be continuous. The other end portion 1b is positioned on the side of a rotary drive mechanism 2 that drives the rotary drum 1 to rotate. A ventilation port is provided to each of the one end portion 1a and the other end portion 1b. The ventilation port of the one end portion 1a serves as an air supply port that supplies the treatment gas from the outside to the inside of the rotary drum 1. The ventilation port of the other end portion 1b serves as an air discharge port for discharging the treatment gas from the inside of the rotary drum 1 to the outside. The treatment gas supplied into the rotary drum 1 via the air supply port of the one end portion 1a passes through the inside of a particle layer A in the rotary drum 1, and is discharged from the air discharge port of the other end portion 1b.

In the rotary drum 1, a measuring unit 3 is provided. In the present embodiment, the measuring unit 3 includes a light transmitting member 3a and an optical sensor 3b that are provided at the central region of the inner wall (a disk plate having a porous portion) of the other end portion 1b. The light transmitting member 3a is formed to be bowl-like with, e.g., transparent glass, particularly tempered glass, and the peripheral portion thereof is arranged such that the peripheral portion is flush with the inner wall of the other end portion 1b. When the rotary drum 1 rotates, the entire region (or the partial region) of the surface of the light transmitting member 3a is brought into contact with the particle layer A. The optical sensor 3b is, for example, an NIR sensor of a near infrared (NIR) spectroscopic analyzer, and arranged in the measuring unit 3 which is separated from the particle layer A by the light transmitting member 3a. The inside of the measuring unit 3 communicates with a hollow portion of a hollow drive shaft 2a of the rotary drive mechanism 2. The detection information of the NIR sensor 3b is sent to a processing unit of the external NRI spectroscopic analyzer via a cable 3c inserted through the hollow portion of the hollow drive shaft 2a.

When the particles (e.g., pharmaceutical drug tablets) are subjected to a coating treatment, information as to the properties (such as the coating thickness, the moisture, the coating performance, and the impurities) of the particles of the particle layer A being brought into contact with the surface of the light transmitting member 3a is measured on a real-time basis by the NIR sensor 3b via the light transmitting member 3a. The data is processed by the processing unit of the NRI spectroscopic analyzer to thereby perform monitoring. By appropriately adjusting the coating operation conditions (such as the supplied air volume, the supplied air temperature, the spraying condition, and the rotation speed of the rotary drum 1) by feedback control or a manual operation according to the result, it becomes possible to perform the coating treatment of high quality.

Figure 2:
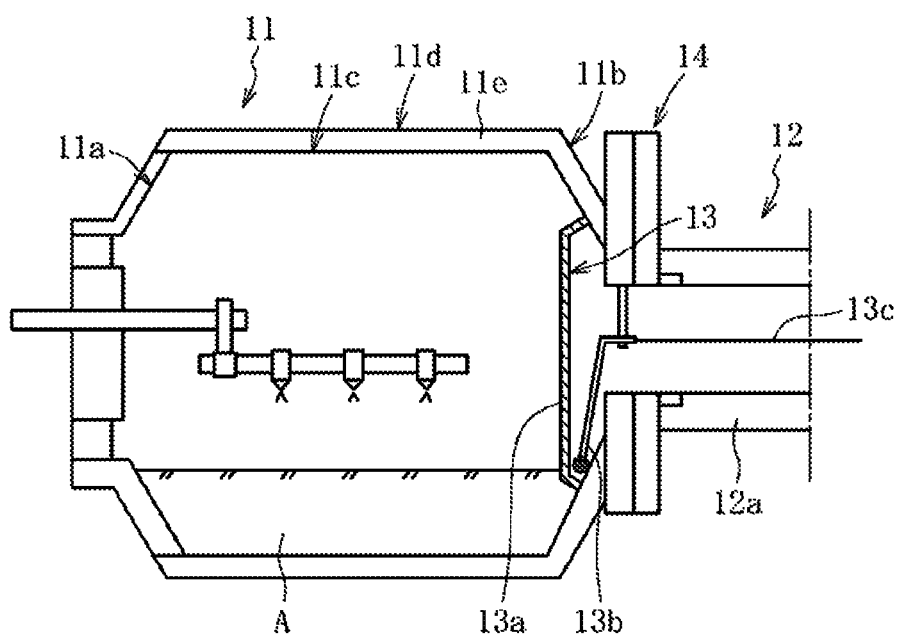
FIG. 2 is a schematic cross sectional view of other embodiment of the present invention.

FIG. 2 shows a coating apparatus according to a second embodiment of the present invention. The coating apparatus is basically structured similarly to the coating apparatus disclosed in Japanese Unexamined Patent Application Publication No. 2001-58125 (Patent Document 1), and includes a ventilatory rotary drum 11 that is driven to rotate about an axis parallel to the horizontal line.

The rotary drum 11 is structured with a polygonal sleeve-like circumferential wall portion 11c, a one end portion 11a that extends from one end of the circumferential wall portion toward the one side in the axial direction, and an other end portion 11b that extends from the other end of the circumferential wall portion 11c toward the other side in the axial direction. To each face of the circumferential wall portion 11c, a porous plate is attached. The porous portion of each porous plate provides ventilation to the circumferential wall portion 11c. Then, a jacket 11d is attached on the outer circumferential side of each porous plate, whereby a ventilation channel 11e is formed between the jacket 11d and each porous plate.

On the other end portion 11b of the rotary drum 11, a rotary drive mechanism 12 and a ventilation mechanism 14 that controls ventilation of treatment gas such as dry air to the rotary drum 11 are installed. This ventilation mechanism 14 has a function of establishing communication between each ventilation channel 11e that arrives at prescribed positions in accordance with the rotation of the rotary drum 11 and an air supply duct and an air discharge duct, both of which are not shown. For example, the treatment gas introduced from the not-shown air supply duct into the ventilation channel 11e at the top portion of the rotary drum 11 flows into the rotary drum 11 via the porous plate at the top portion of the circumferential wall portion 11c. After passing through the inside of the particle layer A, the treatment gas flows out to the ventilation channel 11e via the porous plate at the bottom portion of the circumferential wall portion 11c, and further passes through the ventilation channel 11e to be discharged to the air discharge duct.

In the rotary drum 11, a measuring unit 13 is provided. In the present embodiment, the measuring unit 13 includes a light transmitting member 13a and an optical sensor 13b that are provided at the central region of the inner wall of the other end portion 11b. The light transmitting member 13a is formed to be plate-like with, e.g., transparent glass, particularly tempered glass, and the peripheral portion thereof is arranged such that the peripheral portion is flush with the inner wall of the other end portion 11b. When the rotary drum 11 rotates, the partial region (or the entire region) of the surface of the light transmitting member 13a is brought into contact with the particle layer A. The optical sensor 13b is, for example, an NIR sensor of a near infrared (NIR) spectroscopic analyzer, and arranged in the measuring unit 13 which is separated from the particle layer A by the light transmitting member 13a. The inside of the measuring unit 13 communicates with a hollow portion of a hollow drive shaft 12a of the rotary drive mechanism 12. The detection information of the NIR sensor 13b is sent to a processing unit of the external NRI spectroscopic analyzer via a cable 13c inserted through the hollow portion of the hollow drive shaft 12a.

When the particles (e.g., pharmaceutical drug tablets) are subjected to a coating treatment, information as to the properties (such as the coating thickness, the moisture, the coating performance, and the impurities) of the particles of the particle layer A being brought into contact with the surface of the light transmitting member 13a is measured on a real-time basis by the NIR sensor 13b via the light transmitting member 13a. The data is processed by the processing unit of the NRI spectroscopic analyzer to thereby perform monitoring. By appropriately adjusting the coating operation conditions (such as the supplied air volume, the supplied air temperature, the spraying condition, and the rotation speed of the rotary drum 1) by feedback control or a manual operation according to the result, it becomes possible to perform the coating treatment of high quality.

Figure 3:
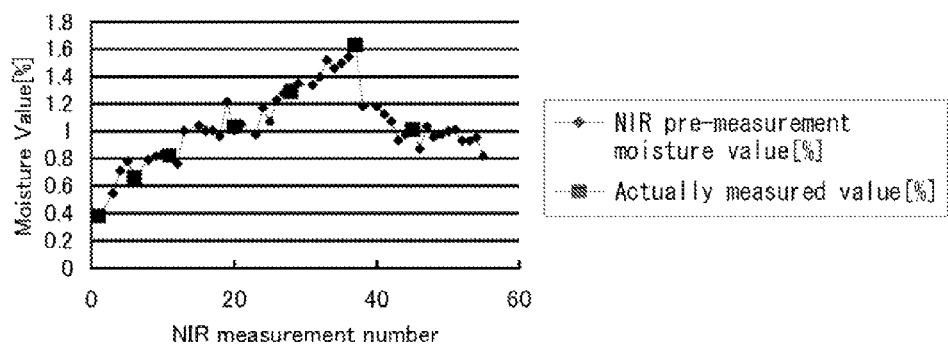
FIG. 3 is a diagram showing measured values and actually measured values of the moisture value of particles.

FIG. 3 shows measured values of the moisture value of the particles measured by the measuring unit 3 and actually measured values of the moisture value of the particles, in connection with the coating treatment of the tablets using the coating apparatus shown in FIG. 1. As can be seen from the drawing, the measured values and the actually measured values of the moisture value of the particles show excellent correlation.

Meanwhile, when the near infrared light projected from the light projecting unit of the NIR sensor is diffused at the surface of the light transmitting member, in some cases, the light receiving unit detects not only the reflected light component reflected at the particle surface of the particle layer, but also the diffused light component diffused at the surface of the light transmitting member, whereby the detection precision reduces. This problem can be solved by adjusting the installation angle of the NIR sensor relative to the surface of the light transmitting member (an angle formed by the optical axis of the light receiving unit or the light projecting unit of the NIR sensor and the surface of the light transmitting member).

Figure 4:
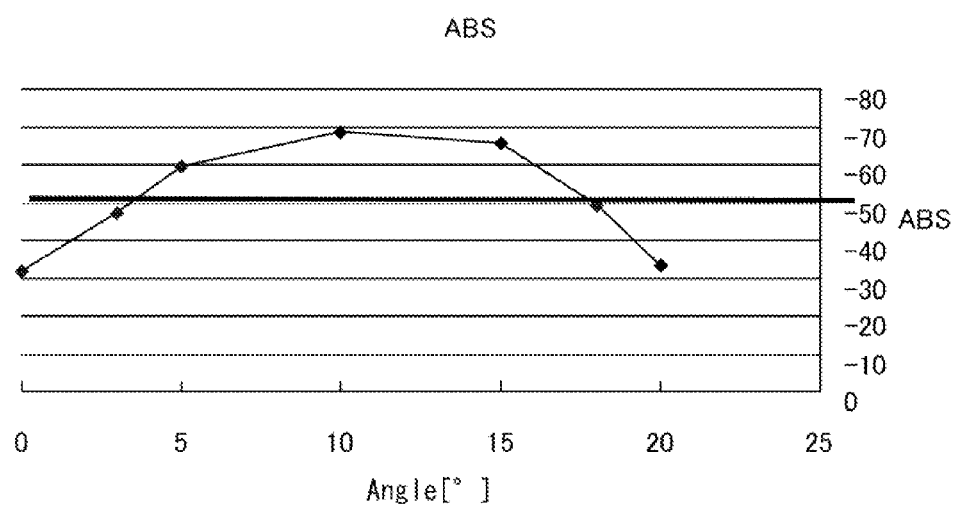
FIG. 4 is a diagram showing the absorbance (ABS) measurement result.

In order to obtain a preferable installation angle of the NIR sensor, the absorbance (ABS) was measured. The measurement of the absorbance (ABS) was performed by; inputting the particles (sample tablets) into the coating apparatus shown in FIG. 1; rotating the rotary drum 1; varying the installation angle of the NIR sensor 3b; and projecting the light having wavelengths of 1200 to 1500 nm (i.e., the wavelength region required for measuring moisture) from the NIR sensor 3b. FIG. 4 shows the measurement result. In FIG. 4, the horizontal axis indicates the installation angle of the NIR sensor 3b (the angle formed by the optical axis of the light receiving unit of the NIR sensor 3b and the surface of the light transmitting member 3a), and the vertical axis represents the absorbance (ABS: negative values).

The smaller the value of the absorbance (ABS) is, the smaller the effect of the diffusion of light is. That is, the smaller the value of the absorbance (ABS) is, the greater the effect of the reflected light component reflected at the tablet surface is. This realizes measurement of higher precision. As can be seen from the measurement result shown in FIG. 4, when the value of the absorbance (ABS) is −50 or less, the measurement result shows excellent correlation relative to the moisture value of the sample tablet measured off-line. Thus, it was found that the installation angle of the NIR sensor 3b is preferably 5 to 15°.

DESCRIPTION OF REFERENCE SIGNS 1, 11: Rotary drum
2, 12: Rotary drive mechanism
2a, 12a: Hollow drive shaft
3, 13: Measuring unit
3a, 13a: Light transmitting member
3b, 13b: NIR sensor

The invention claimed is:

1. A coating apparatus, comprising:
    a rotary drum having an inside portion for accommodating particles to be treated therein and being driven to rotate about its axis, the rotary drum having, along an axial direction thereof, a first end portion, a second end portion, and a circumferential wall portion between the first end portion and the second end portion; and
    a measuring unit provided at the second end portion of the rotary drum, wherein
    the measuring unit includes a light transmitting member arranged at an inner wall of the second end portion of the rotary drum so as to be in contact with a layer of the particles in the inside portion of the rotary drum, and an optical sensor arranged at an outside of the inside portion of the rotary drum so as to measure a property of the particles of the particle layer being in contact with the light transmitting member via the light transmitting member, wherein
    the second end portion of the rotary drum is coupled to a hollow drive shaft of a rotary drive mechanism that drives the rotary drum to rotate, and
    an inside of the measuring unit communicates with a hollow portion of the hollow drive shaft.

2. The coating apparatus according to claim 1, wherein the optical sensor is a near infrared sensor of a near infrared spectroscopic analyzer.

3. The coating apparatus according to claim 2, wherein the second end portion of the rotary drum is coupled to a hollow drive shaft of a rotary drive mechanism that drives the rotary drum to rotate, and
    an inside of the measuring unit communicates with a hollow portion of the hollow drive shaft.

* * * * *